Nov. 25, 1952 P. KELLNER 2,619,052
DOUGH CUTTING AND SPREADING MACHINE
Filed April 24, 1948 4 Sheets-Sheet 1
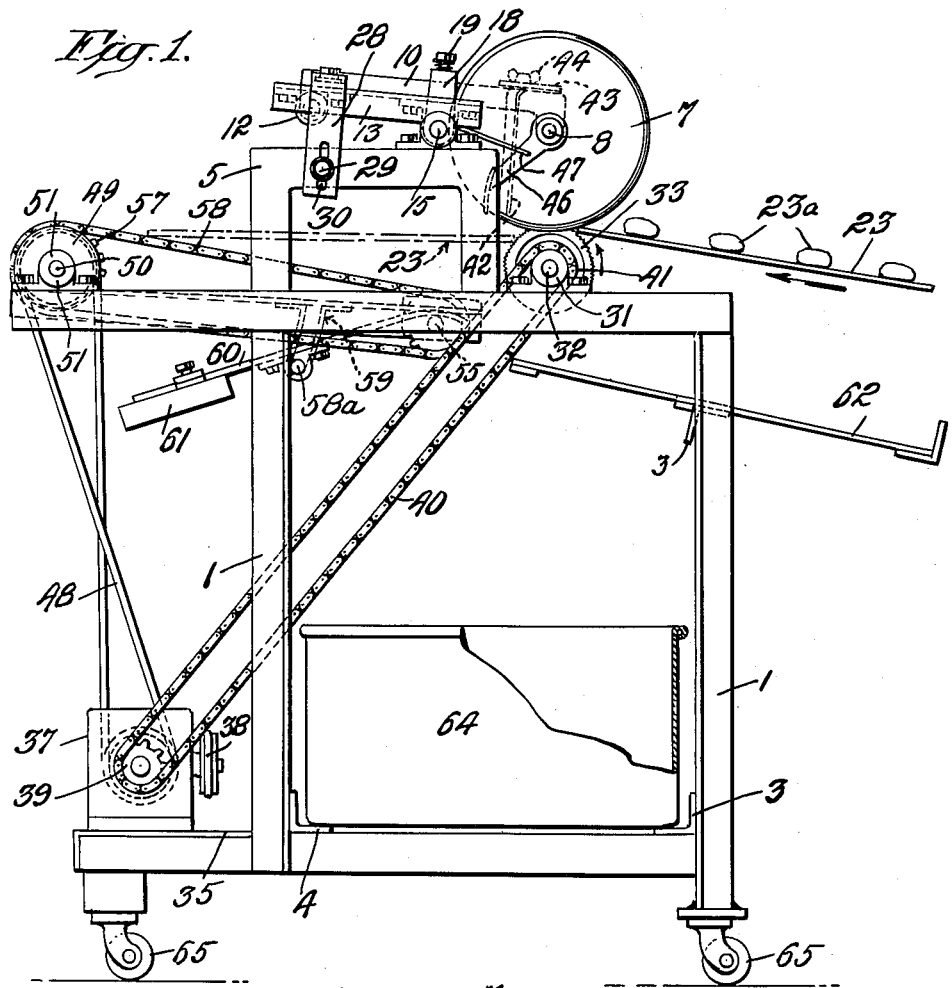
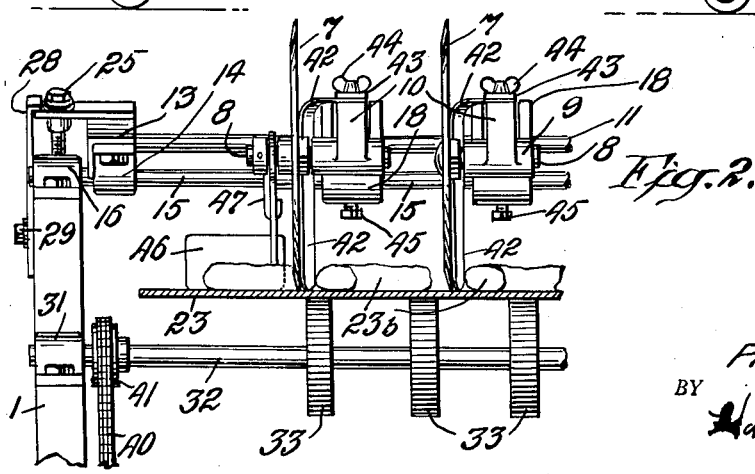
INVENTOR.
PAUL KELLNER
BY
ATTORNEYS Nov. 25, 1952 — P. KELLNER — 2,619,052

DOUGH CUTTING AND SPREADING MACHINE

Filed April 24, 1948 — 4 Sheets-Sheet 2

INVENTOR.
PAUL KELLNER
BY Hauff Harland
ATTORNEYS

Nov. 25, 1952        P. KELLNER        2,619,052
DOUGH CUTTING AND SPREADING MACHINE
Filed April 24, 1948        4 Sheets-Sheet 3
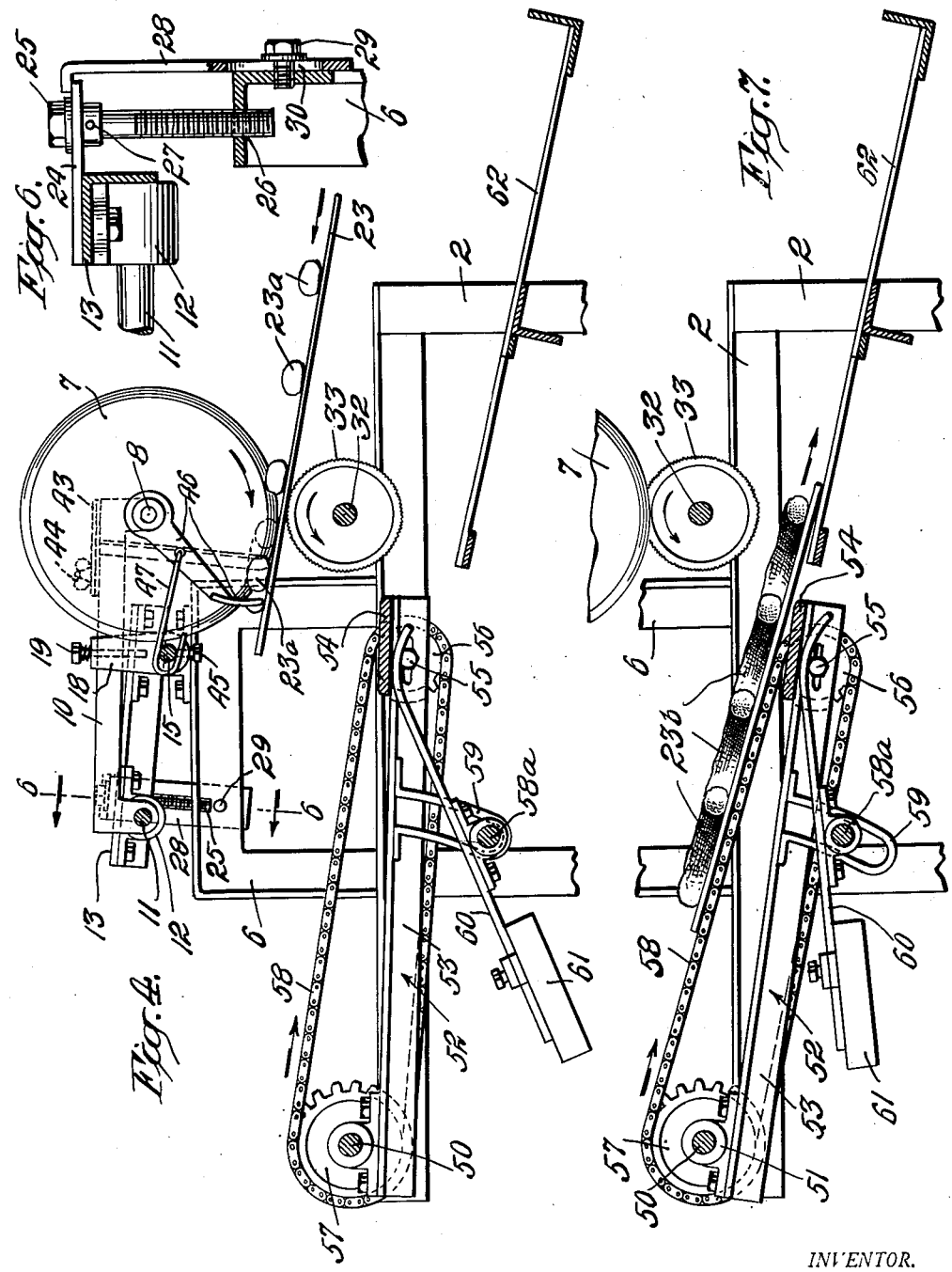
INVENTOR.
PAUL KELLNER
BY Hauff & Harland
ATTORNEYS Nov. 25, 1952 P. KELLNER 2,619,052
DOUGH CUTTING AND SPREADING MACHINE
Filed April 24, 1948 4 Sheets-Sheet 4

INVENTOR.
PAUL KELLNER
BY
ATTORNEYS

Patented Nov. 25, 1952

2,619,052

UNITED STATES PATENT OFFICE 2,619,052

DOUGH CUTTING AND SPREADING MACHINE

Paul Kellner, New York, N. Y., assignor to Dukay Machinery Corporation, New York, N. Y., a corporation of New York Application April 24, 1948, Serial No. 22,975

3 Claims. (Cl. 107—22)

1

This invention relates to machines used in bakeries for cutting prepared strips or rolls of dough into sections and orienting the sections in any desired fashion preparatory to their being transferred in any suitable manner to a baking oven.

The machine is especially adapted for severing long strips of dough into sections for making so-called club rolls or other small articles to be baked while the dough strips are situated on peel boards or other suitable platforms and fed into the machine.

In the preparation of club rolls for the baking process, the peel boards carrying a series of dough strips are sometimes fed into one end of a machine and successively subjected to a series of operations including a slicing step by a plurality of adjacently mounted rotary cutters, followed by a spreading operation which separates the severed sections on the board and finally the boards are discharged at the opposite end of the machine. The machinery necessary to perform this series of operations while the boards pass in series along an elongated platform is necessarily complicated as well as cumbersome and requires at least two or more operators to properly handle a single machine.

Furthermore, since following the severing operations, the boards are manually handled in transporting them from the cutting machine to the oven, and while the dough is being deposited in the oven, there is a tendency for the severed sections to roll against one another and become displaced from the original position which they occupied on emerging from the cutting machine. This is a source of annoyance and inconvenience to bakers as the sections often become fused together during the baking process resulting in loss of time and wastage of products.

It is primarily an object of the present invention to provide a machine for severing prepared dough strips into sections which can be conveniently handled by a single operator and which greatly simplifies the machinery customarily employed for such an operation.

Another object of the invention is to provide a simplified form of mechanism for handling peel boards or similar supports or platforms which automatically arranges the severed sections in such a manner preparatory to the baking operation that these sections do not become relatively displaced while being transported to and deposited in the oven.

Other objects and advantages of the invention will become increasingly apparent upon a detailed

2 study of the following description taken in conjunction with the accompanying drawings wherein:

Fig. 1 is a side elevation of my improved machine showing a peel board in the act of being fed into the rotary cutters.

Fig. 2 is a partial end view of the machine from the right side showing two of the cutting devices.

Fig. 4 is a sectional view showing in particular the peel board at the beginning of the cutting operation.

Fig. 6 is a sectional detail taken on the line 6—6 of Fig. 4.

Fig. 7 shows the peel board after completion of the cutting operation in the process of being returned to the operator.

Figure 8:
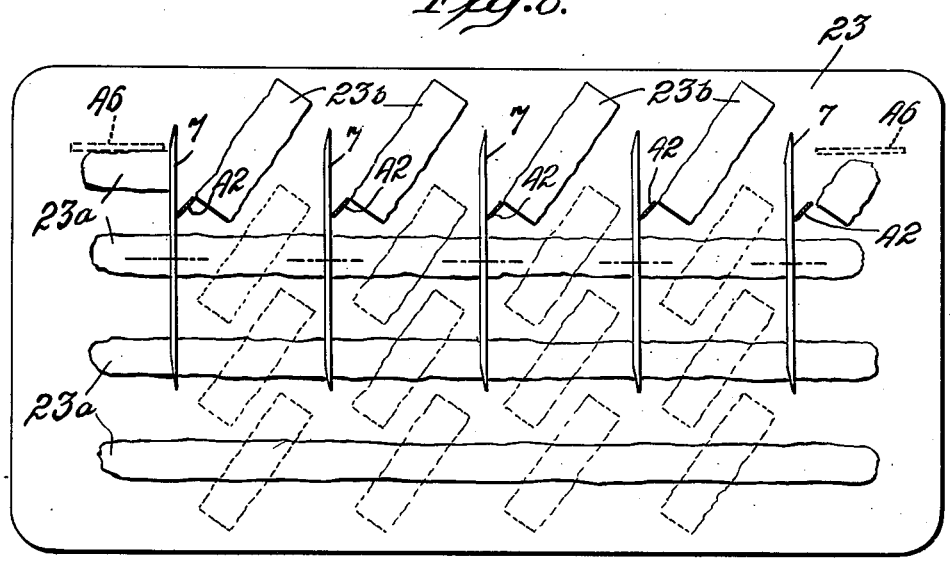

Fig. 8 schematically views the peel board during the cutting and orientation of the severed sections of dough.

Figure 9:
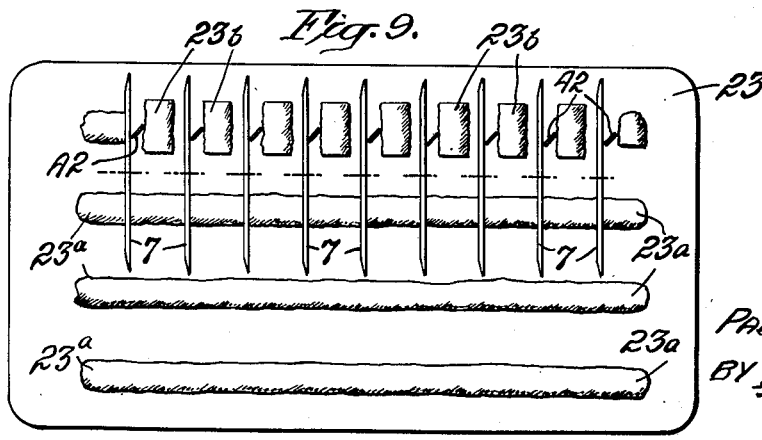

Fig. 9 shows a modified arrangement of the rotary cutters to vary the position of the severed sections on the peel board.

Figure 5:
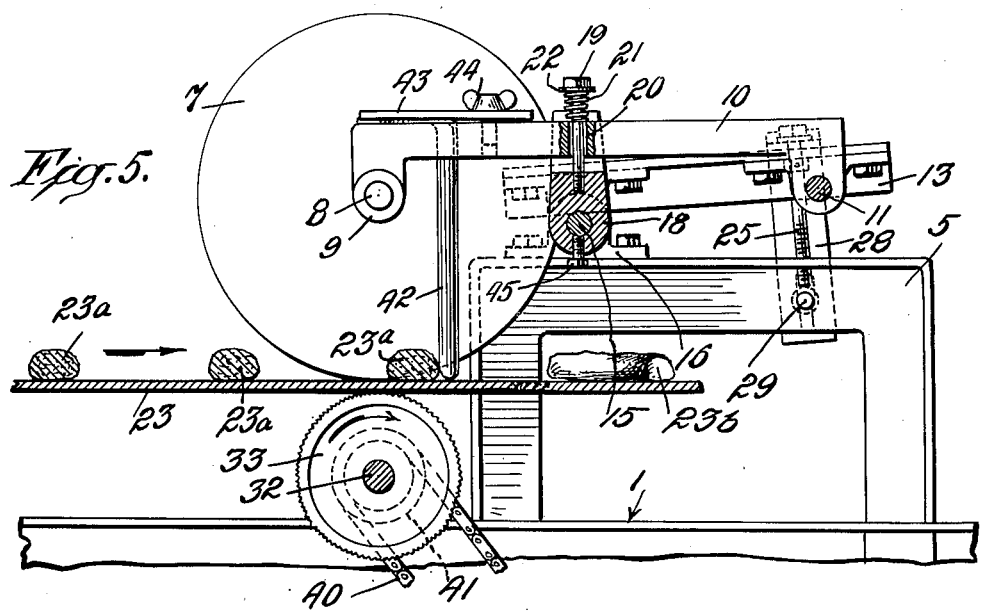
Fig. 5 is a sectional view from the opposite side of the machine with the peel board passing beneath the cutters in a substantially horizontal position.

Referring to the drawings where a preferred embodiment of my invention is shown for illustrative purposes, I preferably construct my machine by providing spaced side frames 1 and 2, held in spaced relationship by front and rear cross-members 3 and 4 and having at the sides the vertical extensions 5 and 6 upon which are yieldingly and adjustably supported a plurality of rotary cutters 7. These cutters 7, as shown in Figs. 2 and 5, are supported on studs 8 rotatable in bearings 9 disposed in the downwardly turned ends of a plurality of arms 10 the opposite ends of which are slidable on a shaft 11 extending transversely of the machine and secured at 12 to arms 13 disposed at either side of the machine. At their forward ends, the clamp arms 13 are secured at 14 to a second transverse shaft 15, rotatably journalled in bearings 16 and 17 mounted on top of the vertical extensions 5 and 6 of the side frames 1 and 2. Adjustably mounted on the shaft 15 are a plurality of U-shaped retaining brackets 18, shown in detail in Fig. 5, each provided with a bolt 19 freely movable in an opening 20 of the arm 10 and provided with a coil spring 21, disposed between the arm and a washer 22 to yieldingly urge downward the arm 10 and rotary cutting knife 7. The rotary cutter 7 may be adjustable vertically with respect to a peel board 23 by the following mechanism. At the rear, the clamp arms 13 are welded to extensions 24, each of which carries a bolt 25, the end of which is threaded into an opening 26 formed in the vertical supports 5 and 6. A washer 27 is riveted to each bolt 25 immediately below the extension 24. Inwardly turned clamp brackets 28 are adjustably secured to the vertical extensions 5 and 6 by bolts 29 which extend through slots 30. It is apparent that adjustment of the bolts 25 causes the rotary cutters 7 and associated carriage mechanism to pivot on the shaft 15 to vary downward pressure of the knives on the peel boards 23.

Secured on top of the side frames 1 and 2 are bearings 31 for a power driven shaft 32 which carries a series of tractor wheels 33 secured to said shaft and adapted to cooperate with the rotary cutting knives 7 to frictionally engage and move the peel board 23 while a series of dough strips 23a are being severed between the rotary cutting knives 7. As shown in Figs. 1 and 7, the cutting knives 7 are adjusted so that the lower part of each cutting knife extends slightly below the upper portions of the tractor wheels 33 because of the action of the coil springs 21. However, when a peel board 23 bearing the arranged dough strips 23a is fed into the machine in the manner shown in Fig. 1, the peel board is engaged between the tractor wheels 33 and the cutting knives 7 causing the cutting knives to move yieldingly upward, as shown in Fig. 4, so that the cutting knives are rotated to perform the cutting action by frictional contact with the peel board 23.

The mechanism for driving the tractor wheels 33 is essentially as follows. On a platform 35 supported on a rearward extension formed at the bottom of the side frames 1 and 2 is a motor 36 driving a reduction gear 37 through a belt 38. The reduction gear 37 is provided with a sprocket 39 which drives a link chain 40, the opposite end of which engages a sprocket 41 mounted on the end of the power shaft 32 which carries the tractor wheels 33.

After the peel boards containing the dough strips are fed into the machine in the manner illustrated, I provide means operating after the severance of the strips into sections for orienting the severed sections into a configuration which greatly facilitates the handling of the peel boards and severed dough strips on delivery from the machine. The means provided in the particular embodiment I have shown for illustrative purposes, comprises fingers 42 in the form of metal strips, the lower portions of which are disposed at an angle to the travel of the severed dough strips and directly in the path of the severed sections 23b as shown in Fig. 8, so that as the peel board proceeds between the cutting knives and the tractor wheels 33, the sections are turned at an angle from the position they formerly occupied.

This greatly contributes to ease of handling of these boards by the baker since when the strips are disposed at such an angle, they do not readily tend to become displaced relative to each other during handling and particularly when deposited in the oven, which is usually accomplished by rapidly withdrawing the board and causing the sections to be deposited in the oven as a group wherein the sections have approximately the relationship which they bore to each other on the board. This eliminates the inherent tendency of the sections to roll against one another and fuse together in the baking operation. It is likewise within the contemplation of the present invention to turn the sections so that they are disposed lengthwise to the direction of travel as shown in Fig. 9, either by moving the cutter knives into closer proximity as shown in Fig. 9 or by modifying the means associated with the cutter knives, for example.

Figure 3:
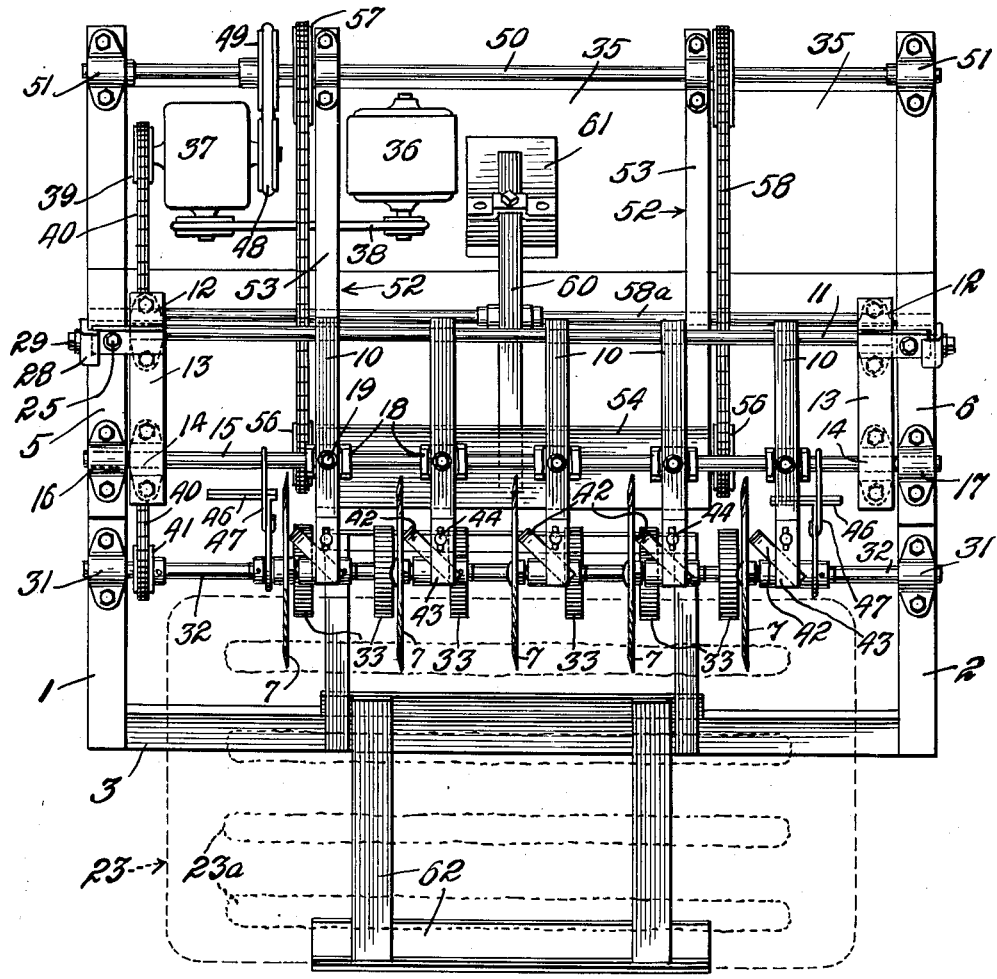
Fig. 3 is a plan view of the machine shown in Fig. 1.

The fingers 42 are adjustably clamped to the tops of the arms 10 by flat plates 43, having openings for set screws 44 which extend into threaded openings formed in the arms 10. By these means, it is possible to properly adjust the position of the fingers 42 to impart the desired turning action upon the severed sections of dough strips. The cutter knives 7 are adjustable to form severed sections of different lengths by laterally moving the arms 10 on the shafts 11 and 15 and securing the knives at any desired position by set screws 45. In order to dispose of the outermost sections of dough strips, which are of irregular length, diverting elements 46 are pivotally mounted on the stud shafts 8 of the outermost cutting knives 7 on either side and these diverting elements are normally supported or held in the proper position by restraining hooks 47, having a return bend for engagement with the shaft 15 as shown in Figs. 3 and 4.

Connected with the reduction gear 37 is a belt drive 48 which runs over a pulley 49 mounted on shaft 50, which is journalled in bearings 51 on the side frames 1 and 2. The shaft 50 pivotally supports a conveyor mechanism 52, comprising arms 53 which include a cross member 54 and stub shafts 55 as shown in Figs. 4 and 5. The stub shafts 55 carry sprocket wheels 56 and corresponding sprocket wheels 57 are disposed on the shaft 50 for conveyor chains 58. The conveyor mechanism 52 is so mounted with respect to the knives 7 that the peel boards 23 are delivered onto this conveyor mechanism upon completion of the cutting operation. The conveyor device 52 is so constructed that the delivery of the peel boards 23 on the conveyor mechanism causes the carriage 52 to pivot downwardly by the following mechanism.

A transverse shaft 58a is mounted on the side frames 1 and 2 and is slidably received in brackets 59 disposed upon the arms 53. Pivotally mounted upon the shaft 58 is a lever 60 having a weight 61 at one end and having its other end curved downwardly and in engagement with the under side of the cross member 54. It will be appreciated that the delivery of the peel boards 23 upon the conveyor mechanism hereinbefore described causes the conveyor mechanism to dip downwardly against the resistance of the weighted arm 60 so as to deliver the peel boards onto a receiving carriage 62. Accordingly, the machine may be operated by one person merely feeding the boards through the cutter knives 7 and the tractor wheels 33 and the dough strips 23a severed into sections and oriented by the fingers 42, the peel boards being delivered onto the conveyor mechanism 52 and passed onto the tray 62 wherefrom they may be deposited into the oven. The ends of the dough strips 23a are moved off the sides of the peel boards 23 by the deflecting devices 46 and deposited into a receiving bin 64.

It will be appreciated that the machine forming the subject matter of my invention may be handled by a single operator who merely feeds the peel boards 23 and transverse dough strips 23a beneath the rotary cutting knives 7, one at a time, the operation proceeding automatically and the peel boards conveniently redelivered to the operator in the receiving tray 62. The entire machine may be mounted on rollers 65 so as to be conveniently moved about the bakery.

I claim:

1. A baker's device comprising a machine for severing dough strips disposed on a peel board preparatory to the baking operation including a frame and a plurality of rotary cutters adjacently mounted in spaced relationship relative to each other on said frame, said rotary cutters being vertically movable relative to the frame, a plurality of tractor wheels mounted on said frame below the rotary cutters and in staggered relationship relative thereto, the lower segments of the cutters and the upper segments of the tractor wheels being normally in overlapping relationship, means for driving the tractor wheels so as to engage and move a peel board fed by an operator between the rotary cutters and the tractor wheels and perform a cutting operation on dough strips disposed on the peel board, an endless belt conveyor mounted on the frame beyond the cutters and disposed at an angle to receive the peel boards after the cutting operation and return the same to the operator below the cutters.

2. A baker's device comprising a machine for severing dough strips, disposed on a peel board preparatory to the baking operation, including a frame and a plurality of rotary cutters adjacently mounted in spaced relationship to each other on said frame, a power-driven rotary conveyor mounted on said frame below the rotary cutters and means for urging the lower segments of the rotary cutters and the conveyor means into closer proximity to engage and frictionally move the peel board carrying the dough strips to be severed below the cutters and a reversely-driven endless belt conveyor mounted on a portion of the frame beyond the cutters to receive the peel boards after the cutting operation and return the same to the operator below the cutters.

3. A baker's device comprising a machine for severing dough strips disposed on a peel board preparatory to the baking operation, including a frame and a plurality of rotary cutters adjacently mounted in spaced relationship to each other on said frame, a power-driven rotary conveyor mounted on said frame below the rotary cutters and means for urging the lower segments of the rotary cutters and the conveyor into closer proximity to engage and frictionally move the peel board carrying the dough strips to be severed below the cutters and a reversely-driven endless belt conveyor pivotally mounted with respect to the frame and loading means adapted to normally hold the belt in a more nearby horizontal plane and to become overbalanced on receiving a peel board, thereby tilting the conveyor belt downwardly to return the same to the operator below the cutters.

PAUL KELLNER.

REFERENCES CITED

The following references are of record in the file of this patent:

UNITED STATES PATENTS

| Number | Name | Date |
| --- | --- | --- |
| 499,460 | Hooper | June 13, 1893 |
| 939,981 | Coburn | Nov. 16, 1909 |
| 1,200,428 | Lawrence | Oct. 3, 1916 |
| 2,104,205 | Menapace | Jan. 4, 1938 |
| 2,380,172 | Harber | July 10, 1945 |